Figure 1:
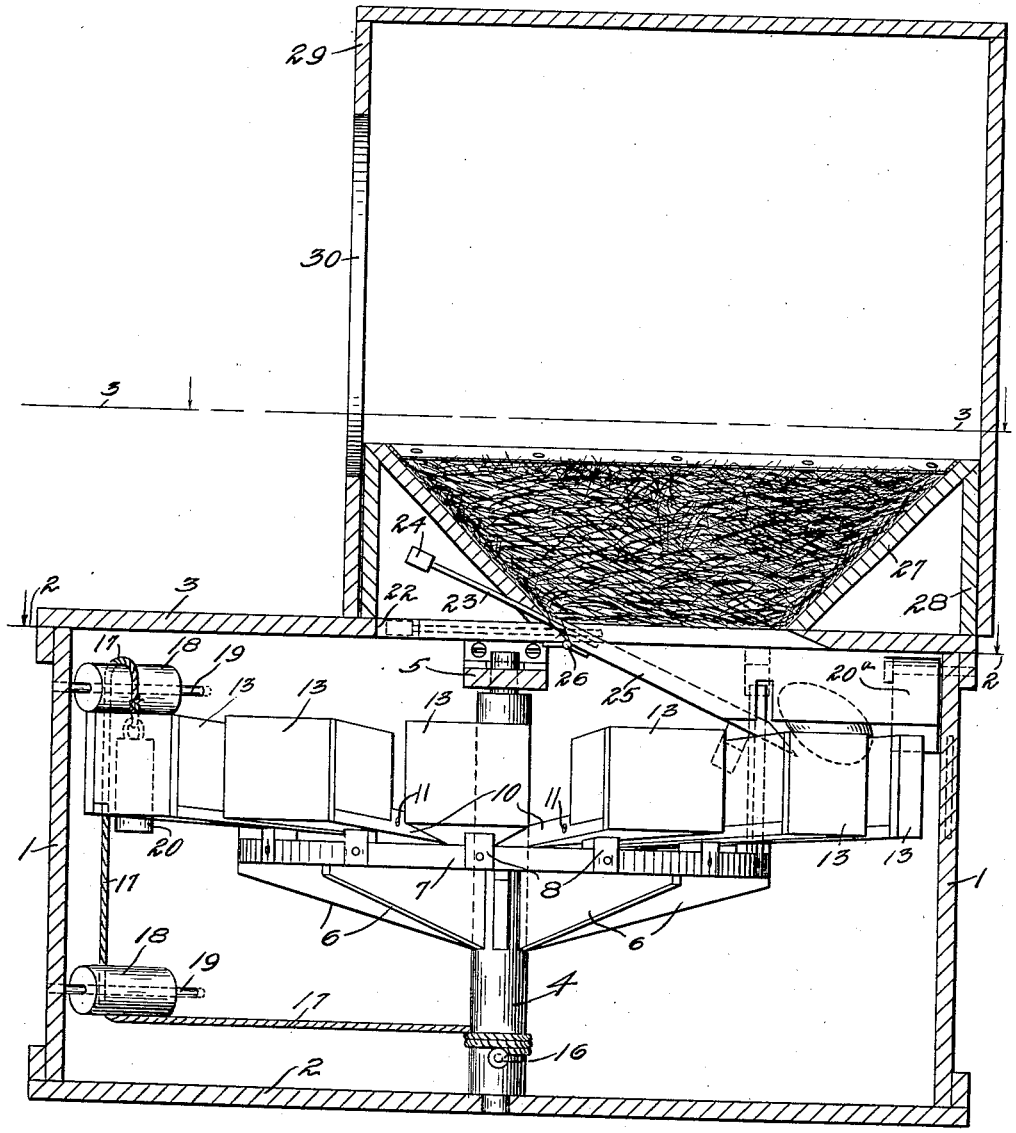

P. L. HAAKENSON.
HEN'S NEST.
APPLICATION FILED JULY 17, 1913.

1,096,300. Patented May 12, 1914.
4 SHEETS—SHEET 1.

WITNESSES:
Paul A. Viersen.
Leona V. Daughty.

INVENTOR
P. L. Haakenson
H. Sardson
BY
ATTY.

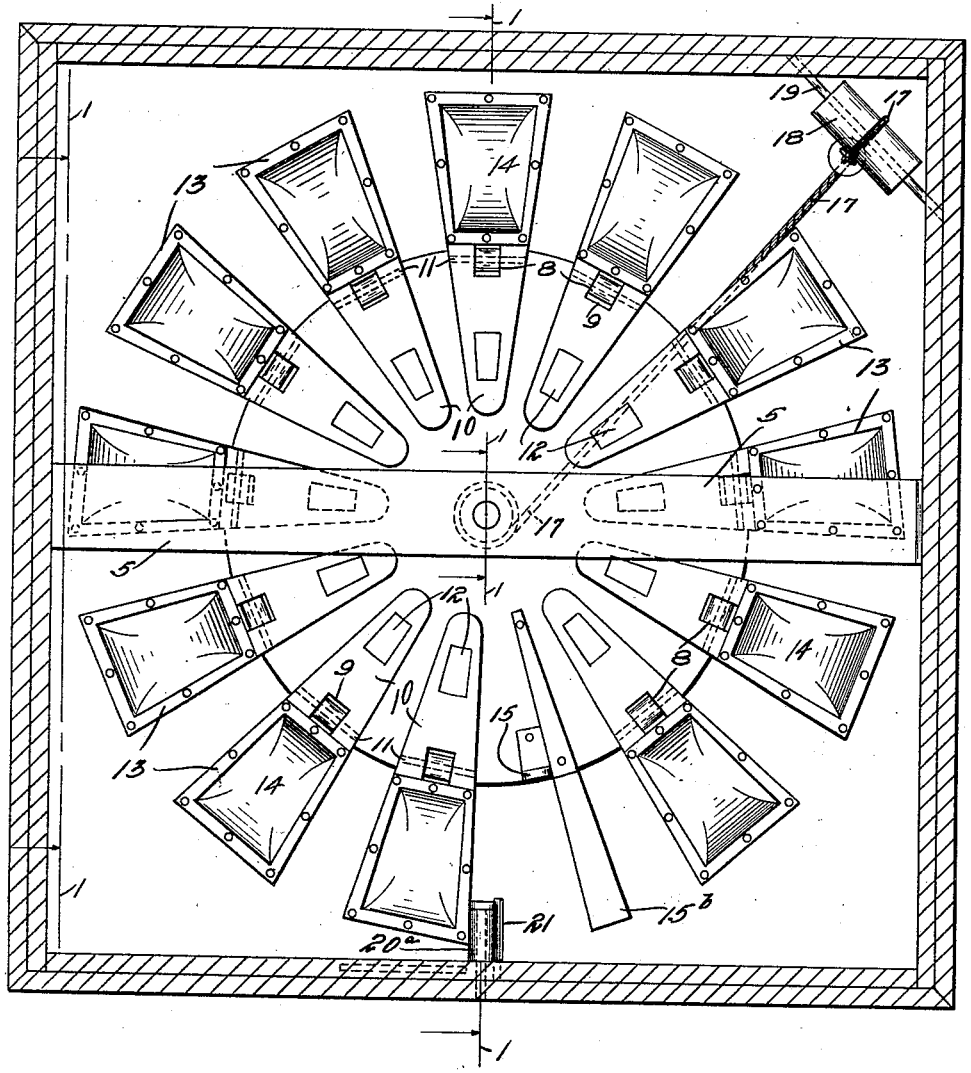

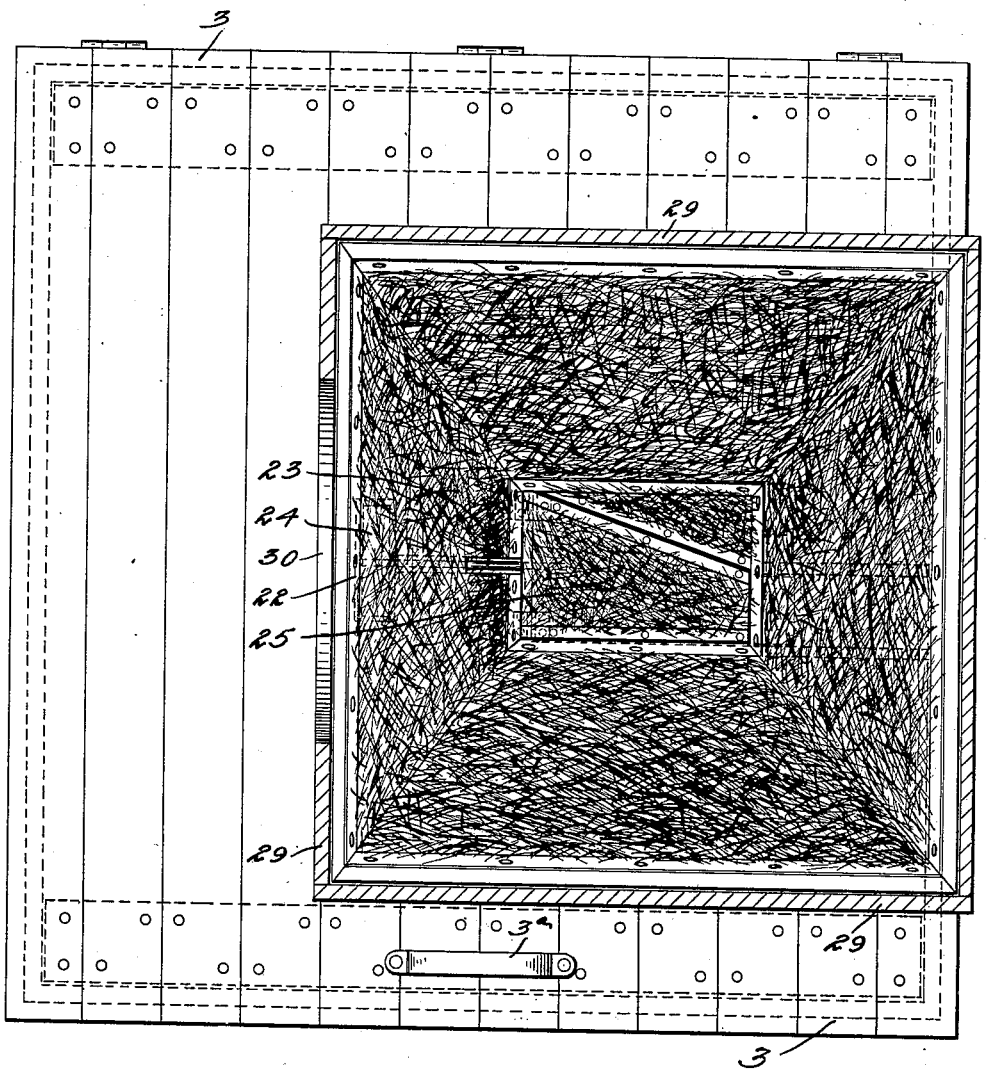

P. L. HAAKENSON.
HEN'S NEST.
APPLICATION FILED JULY 17, 1913.
1,096,300.
Patented May 12, 1914.
4 SHEETS—SHEET 4.
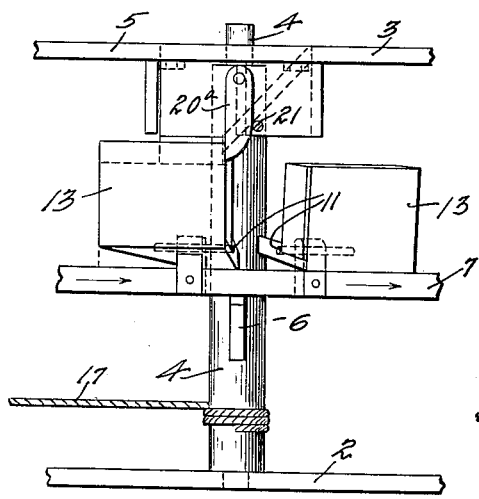
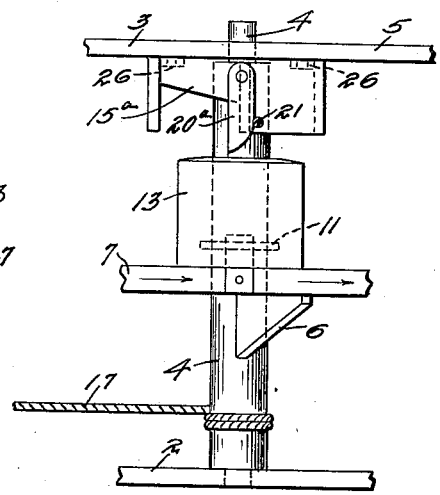
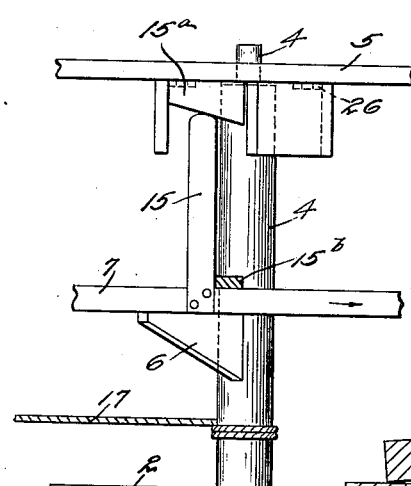
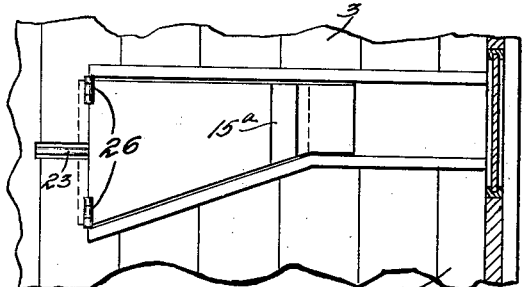
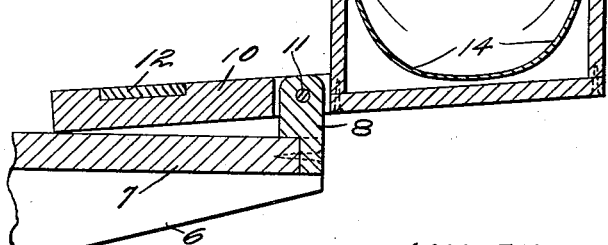
WITNESSES:
Paul A. Viersen
Leonard V. Daughtry
INVENTOR
P. L. Haakenson
H. Dardis
BY                    ATTY.

UNITED STATES PATENT OFFICE.

PEDER L. HAAKENSON, OF BARTON, NORTH DAKOTA.

HEN'S NEST.

1,096,300.  Specification of Letters Patent.  Patented May 12, 1914.

Application filed July 17, 1913. Serial No. 779,464.

*To all whom it may concern:*

Be it known that I, PEDER L. HAAKENSON, a citizen of the United States, residing at Barton, in the county of Pierce and State of North Dakota, have invented certain new and useful Improvements in Hens' Nests, of which the following is a specification.

This invention relates to improvements in hens' nests and its object is to produce a device of this class in which the eggs will pass from the nest proper, as soon as laid, through a trap door into one of a series of boxes consecutively arranged upon a rotary platform which will thereby be caused to move partially about its axis a distance equal to the distance between any two consecutive boxes in the series; means for instantly ascertaining the exact number of eggs in the series at any time are also provided; another object is to provide means for automatically locking the trap door of the nest proper as soon as the boxes of the rotary platform are filled.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a vertical section through the nest in side elevation and is taken on line 1—1 of Fig. 2. Fig. 2 is a section taken on line 2—2 of Fig. 1. Fig. 3 is a section taken on line 3—3 of Fig. 1. Fig. 4 is a detail of a portion of the device. Fig. 5 is a view of Fig. 4 with the parts in an altered or advanced position. Fig. 6 is another view of Fig. 4 with the parts in a still further advanced position. Fig. 7 is an inverted plan of the trap door of the nest. Fig. 8 is a vertical section through one of the egg boxes and its connections.

Like reference characters indicate corresponding parts throughout the several views.

1 is the boxing in which the mechanism of the nest is disposed and it is provided with a base 2 and a hinged cover 3 having a handle 3ª. Within the box a rotary shaft 4 is disposed having its ends reduced and one of them journaled in the center of the base 2 of the box and the other bearing in a beam 5 extending across the box and secured to the inner side of the cover 3. To the shaft 4 a plurality of supports 6 are secured that carry the rotary platform 7 provided about its periphery with blocks 8 that protrude through the apertured portions 9 of levers 10 that are pivoted upon pins 11 passing through the said blocks. At one end of each lever 10 a counter-weight 12 is carried while an egg box 13 is carried at its opposite extremity; each egg box being provided with a suitable lining 14 and said boxes being spaced approximately 28 degrees apart through an arc of approximately 340 degrees.

15 is a stop pin adapted for locking engagement with the cam block 15ª carried by the trap door 25 to be hereinafter described, after the last egg box in the series has been filled and passed beyond the latch 20ª and 15ᵇ is a locking block for engagement with the latch 20ª at this time.

A pin 16 secured in the shaft 4 carries one end of a cord 17 which passes about a pair of rollers 18, 18 mounted upon spindles 19, 19 secured to the box and at its opposite end carries a weight 20 which through gravitation is adapted to rotate the shaft 4 and with it the platform 7 and the egg boxes.

20ª is a stop-latch secured to the box 1 and disposed in the plane of rotation of the empty egg boxes 13 and provided at one side with a pin 21 which prevents its oscillation in one direction but leaves it free to swing in the opposite direction.

The cover 3 is formed with an apertured portion at 22 in which a rod 23 provided with a weight 24 at one termination is normally disposed, the other end of the rod 23 being secured in one end of a trap door 25 hinged as at 26 to the said cover 3 and forming a part of that cover. Directly above the trap door 25 is the funnel-shaped nest 27 a portion of the base of which is formed by the said trap door and a crown 28 disposed upon the cover 3 surrounds and partially supports the said nest.

29 is a hood formed with an opening 30 and disposed upon the cover 3 about the said nest and crown 28.

31 is a window in the boxing through which the number of the boxes filled with eggs may be readily seen.

Operation: In normal position the trap door 25 is closed and the bar 23 and weight 24 are in the position shown dotted in Fig. 1. The hen now enters the hood 29 through the opening 30 and sits upon the nest. When the egg is laid it falls upon the trap door and opens the same, raising the weight and rod to the position shown in full lines in Fig. 1. The egg rolls off the trap door while the same is in open position and is deposited into the open egg box directly beneath; the weight of the egg now depresses said egg box, oscillating the lever 10 upon its pin and raising the weighted end of the same, thus permitting said egg box to pass beneath the stop-latch 20ª as the weight 20 sets the shaft 4 in motion. The next egg box is now moved into the position vacated by the box now containing the egg just dropped, the movement of the platform 7 being arrested by contact of the said empty egg box with the stop latch 20ª. The consecutive egg boxes will be filled in the manner described and when all are filled the stop pin 15 is brought up beneath and wedged tight against the cam block 15ª on the bottom of the trap door 25 thus preventing operation of the same should another egg fall upon it. The egg boxes may now be emptied by raising the cover 3 by its handle 3ª and lifting out the eggs. The platform 7 is now manually rotated in a direction opposite to that in which it is impelled by the weight 20 when the nest is again ready for use.

What is claimed is:—

1. A device of the class described, comprising a housing, a rotary platform operatively mounted in said housing, movable egg boxes carried by said platform, actuating mechanism for said platform disposed within said housing, a stop for said rotary platform normally in engagement with one of said egg boxes and egg receiving and conveying means operatively associated with the said movable egg boxes whereby they may be singly moved to disengage said stop thereby setting in motion the aforesaid platform actuating mechanism.

2. In a device of the class described, a housing, a rotary platform operatively mounted in said housing, levers pivotally carried by said platform and provided at one extremity with weights, egg boxes lighter than the said weights carried at the opposite end of said levers, actuating mechanism for said platform disposed within said housing, a stop latch carried by said housing and disposed in the normal plane of rotation of said egg boxes, and egg receiving and conveying means operatively associated with the said egg boxes whereby they may be singly depressed to disengage the said stop latch and permit temporary operation of the said platform actuating mechanism.

3. A device of the class described, comprising a housing, a nest portion carried thereby, pivoted rotary receptacles consecutively arranged disposed within said housing, gravity controlled means for actuating said rotary receptacles, a stop latch for engagement with said rotary receptacles singly and egg receiving and conveying means connecting said nest portion and rotary receptacles whereby the latter may be singly depressed to avoid the said stop latch.

4. A device of the class described, comprising a housing, a nest portion carried thereby, pivoted rotary receptacles consecutively arranged disposed within said housing, gravity controlled means for actuating said rotary receptacles, a stop latch for engagement with said rotary receptacles singly, egg receiving and conveying means connecting the said nest portion and rotary receptacles whereby the latter may be singly depressed to avoid the said stop latch and locking means automatically effective after the said rotary receptacles have passed through an arc of approximately 340 degrees.

In testimony that I claim the foregoing as my own I have hereto affixed my signature in the presence of two subscribing witnesses.

PEDER L. HAAKENSON.

Witnesses:
LARS HAAKENSON,
JOHN BRUSVEN.

---

Copies of this patent may be obtained for five cents each, by addressing the "Commissioner of Patents, Washington, D. C."